Jan. 28, 1969  A. S. DREIDING  3,424,287
YIELDABLE CLUTCH
Filed March 29, 1967
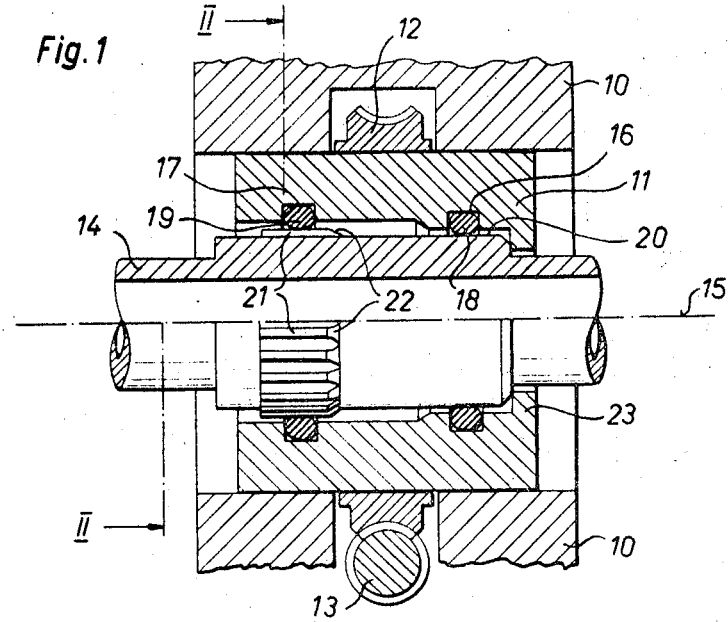
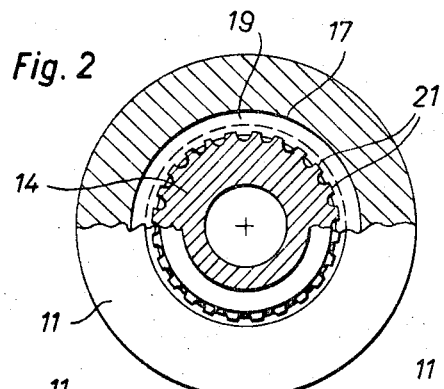
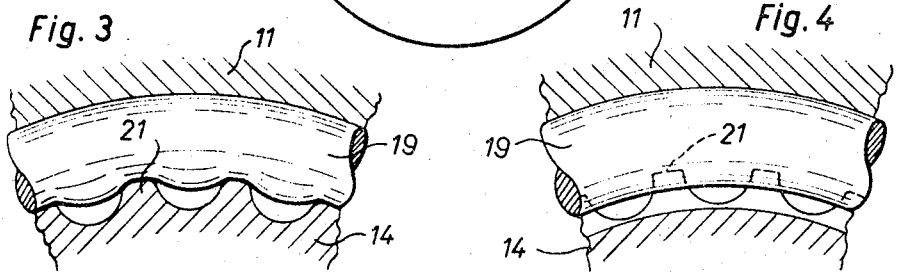
INVENTOR.
André S. Dreiding
BY
Watson, Cole, Grindle & Watson
Attys.

United States Patent Office 3,424,287
Patented Jan. 28, 1969

3,424,287
YIELDABLE CLUTCH
Andre S. Dreiding, Erlenbach, Germany, assignor to BP Chemicals (U.K.) Limited
Filed Mar. 29, 1967, Ser. No. 626,837
Claims priority, application Switzerland, Feb. 3, 1967, 1,834/67
U.S. Cl. 192—55                                    4 Claims
Int. Cl. F16d 3/68, 11/04, 7/02

ABSTRACT OF THE DISCLOSURE

A coupling for transmitting rotary motion from one rotary part to another with one insertable in the other for coupling and withdrawable to release the coupling, and one rotary part having a circular row of axially extending ribs which engage and compress an elastic ring on the other rotary part.

---

This invention relates to a releasable coupling to transfer rotary movement between two rotating parts of which one is insertable in the other and to release the coupling by axial movement.

In comparison with known couplings, the subject matter of this invention is differentiated essentially in that at least one of the rotary parts is provided with a row of toothed ribs around its periphery which are at least close to or extend parallel to the rotary axis of the rotary parts and that the other rotary part is provided with at least one rubber elastic member in a circumferential zone thereof. The elastic member is positioned to extend in radial direction against the first-mentioned rotary part having the row of ribs, when coupling the two rotary parts, by the row of ribs projecting into the elastic member.

In the preferred form of the coupling, the rubber elastic member is provided in a circumferential groove in its specific rotary part and this elastic member preferably has a circular formation in cross section. The toothed ribs can be provided on the outer surface of one insertable rotary part, whereas the rubber elastic ring can be provided in the internal surface of the other rotary part.

The coupling according to the invention can be particularly used to connect and release rotary parts of experimental apparatus, laboratory devices, etc., as for example rotary evaporators for chemical, pharmaceutical and biological laboratories. The main advantage of the coupling consists therein, that the two rotary parts shall have a relating axial movement with ease of coupling and ease of uncoupling so that slippage in the circumferential direction of the parts to be coupled is practically impossible. A further advantage, which is of importance in connection with certain applications, resides in the fact that two rotary parts can be coupled in any desired position of rotation of the parts, which is contrary to known coupling devices having toothed ring coupling elements which can only be brought into engagement in prior definite positions.

Further objects will be apparent from the accompanying drawing when considered in connection with the following description with the drawing showing a preferred form of the invention in which:

FIGURE 1 s an axial longitudinal section showing the coupling in engaged position, FIG. 2 is a cross section taken on line II—II of FIG. 1 in the direction of the arrows, FIG. 3 is a part sectional and side view of a detail on an enlarged scale, with the parts in coupled condition, and FIG. 4 is a part sectional and side view of the detail of FIG. 3 on an enlarged scale with the parts in uncoupled condition.

In the form of the invention illustrated, a bearing body 10 has a sleeve-like rotating element 11 rotatably mounted in the body 10. The element 11 is provided with a driving member 12 which, for example, is a gear ring with a curved periphery on the gear teeth to mesh with a motor driven spiral gear 13. In an inner chamber of the rotary part 11 there is a second rotary part 14 which is mounted loosely or with play therein and which is formed as a hollow shaft. Between the two rotary parts 11 and 14, which have a common axis 15 of rotation, there is provided a considerable radial play. In order to provide for a coaxially holding and for a secure rotation and release coupling, the two rotary parts 11 and 14, the following means and mode of action will take place.

The internal peripheral surface of the rotary part 11 has two grooves 16 and 17 therein in which in each, an endless ring 18 and 19 respectively is provided composed of a rubber elastic or yielding material set therein as to the respective grooves. The rings 18 and 19 in unloaded condition, that is as uncoupled, have a circular appearance in cross-section and fit and extend from the particular inner surface of the rotary part 11 against or toward the other rotary part 14. The cross-sectional diameter of each ring 18 and 19 are in agreement in the unloaded condition close to the width of the particular grooves 16 and 17. The ring 18 is under the influence of its own weak required elasticity against a cylindrical outer surface 20 of the rotary part 14, the diameter of which is only slightly larger than the slight width of the ring 18 in unloaded condition. The other elastically flexible ring 19 is provided in coupled condition opposite a circumferential row of tooth ribs 21 which latter are provided on the outer surface of the rotary part 14 and are approximately parallel to the rotary axis 15. The outer end surface of the toothed ribs 21 are provided on a specific cylindrical surface, the diameter of which is greater than the width of the rings 19 in unloaded condition, that is when the coupling is unloaded, as shown in FIG. 4. The toothed ribs 21 are at least at one of its ends, which takes place when the inner rotary part 14 is shifted from left to right, relative to the rotary axis 15, provided with chamfered ends 22 having an angular surface, as shown in FIG. 1. Finally, there is also provided a flange or stop 23 to limit the axial insertion movement of the rotary part 14.

The operation and use for the described coupling is as follows.

To set or throw in the coupling, the rotary part 14, FIG. 1, is moved axially from left to right into the other rotary part 11. Thereby the rubber elastic deformable ring 18 will slide on the cylindrical outer surface 20 of the rotary part 14, whereby the ring 18 will only be weakly pressed radially outwardly and is forced into the groove 16, so that by means of the ring 18 there will practically be no hindrance to the radial movement of the rotary parts. Accordingly the ring 18 is also not in a position between the rotary parts 11 and 14 to transmit a noteworthy torsional moment, since it can slip on the cylindrical surface 20 of the inner rotation part 14 in the circumferential direction. The ring 18 serves only to approximately center the inner rotary part 14 in the outer part 11.

Upon insertion of the rotation part 14 from left to right in FIG. 1, the other rubber elastic deformable ring 19 will slide over the chamfered end surfaces 22 on the leading ends of the toothed ribs 21 on the row of these toothed ribs whereby the ring 19 by each toothed ribs 21 will be pressed radially outwardly as clearly shown in FIG. 3 since the light width of the ring 19 in the untensioned condition is smaller than the diameter of the aforesaid cylindrical surface on which the radial outer end surface of the toothed ribs 21 will lie. Since the ring 19 will, however, be hindered due to the groove 17, it will simply widen radially to accommodate itself to the circumferential contour of the ring 19 relative to the rotary axis 15 as to the toothed ribs 21 and will transform somewhat to the form of the inner teeth which is in coupling connection to the toothed ribs, FIG. 3. Thereby a slippage of the ring 19 as to its circumferential direction relative to the inner rotational part 14 is practically entirely impossible. By means of the toothed ribs 21 pressing radially on the ring 19 outwardly, a certain widening or bulging of the cross section of the ring will follow as to a direction parallel to the axis 15, with the result that the ring 19 is not only pressed against the bottom of the groove 17, but also against the sides thereof. Thereby the clamping friction between the ring 19 and the outer rotary part 11 will be sufficiently great in order to prevent a slippage of the ring 19 circumferentially relative to the rotary part 11 with safety. Since according to the prior description of the ring 19 in the engaging of the rotary parts, the coupling cannot slip relative to the outer rotary part 11 in relation to the inner rotary part 14 as to the circumferential direction, the two rotary parts 11 and 14 are rigidly connected with each other by moving one in the other, so that a considerable moment of rotation of the driven rotary part 11 on the driving rotary part 14 will be transmitted.

Since the described secure connection of the two rotary parts 11 and 14 will permit this movement in the axial direction without effort when sliding one in the other, coupling and uncoupling are possible without any appreciable expenditure of energy. For releasing the coupling connection between the two rotary parts 11 and 14 it is simply necessary to pull the inner rotary part 14, FIG. 1, out from the right to the left, whereby the two rubber elastic rings 18 and 19 will become untensioned and under the influence of their own elasticity, they will assume their original forms, in which the cross sectional surfaces of each ring will be circular.

If, in order to achieve a secure coupling of the rotary parts 11 and 14, one were to use instead of the ribs 21 a smooth cylindrical surface of sufficiently large diameter on the rotary part 14 to press against the inner circumferential periphery of and to deform the ring 19, the additional deformations created by the relative movements of the parts 11 and 14 in axial and in circumferential directions would be such that more resistance would be created to axial than to torsional slipping. The opposite is desirable here and is achieved by the present invention.

In a form of the invention which is not illustrated, the elastic rubber ring 18 can be provided around its periphery with toothed ribs which can cooperate with the ribs of the inner rotary part 14 instead of having a smooth outer surface of these parts.

Another modified structure, not illustrated, can form the rubber elastic rings 18 and 19 with a circumferential groove which will rest in the outer surface of the inner rotary part 14 and at least in the circumferential direction has a row of toothed ribs on the inner surface of the outer rotary part 11. Also a construction is possible in which each of the two coaxial and cooperating rotary parts have a circumferential row of toothed ribs whereby in turn one at another rotary part a rubber elastic ring will operate together.

In a more simple change of the illustrated and described examples, the groove 16 and the ring 18 can be omitted and thus the two rotary parts 11 and 14 can axially easily slide on each other on flat cylindrical surfaces.

Finally, it is also possible that instead of endless ring 18 and/or ring 19 there can be provided a plurality of separated ring sectors or other forms of rubber elastic members along circumferential zones relative to the rotary parts.

I claim:
1. A coupling for transmitting rotary motion comprising two rotary parts having relative axial movement with one insertable in the other to complete the coupling and to withdraw the one insertable part from the other to release the coupling, at least one of the rotary parts having a circumferentially directed row of toothed ribs which are substantially parallel to the longitudinal rotary axis of the rotary parts, and an elastic member provided on the other rotary part which radially contacts the toothed ribs of the respective rotary part when the two parts are coupled with elastic deformation of the elastic member by the toothed ribs, said elastic member being a ring running in circumferential direction of said other rotary part and having identical cross-section at any location along said ring when the two parts of the coupling are disengaged, and said ring being secured against axial movement with respect to said other rotary part.

2. A coupling according to claim 1, in which said ring is an O-ring having a round cross section and being placed in a circumferential groove provided at said other rotary part.

3. A coupling for transmitting rotary motion comprising two rotary parts having relative axial movement with one insertable in the other to complete the coupling and to withdraw the one insertable part from the other to release the coupling, at least one of the rotary parts having a circumferentially directed row of toothed ribs which are substantially parallel to the longitudinal rotary axis of the rotary parts, and an elastic member provided on the other rotary part which radially contacts the toothed ribs of the respective rotary part when the two parts are coupled with elastic deformation of the elastic member by the toothed ribs, the rotary part having the row of toothed ribs also having smooth circumferential section with the other rotary part having an elastic ring to contact the smooth circumferential section.

4. A coupling for transmitting rotary motion comprising two rotary parts having relative axial movement with one insertable in the other to complete the coupling and to withdraw the one insertable part from the other to release the coupling, at least one of the rotary parts having a circumferentially directed row of toothed ribs which are substantially parallel to the longitudinal rotary axis of the rotary parts, and an elastic member provided on the other rotary part which radially contacts the toothed ribs of the respective rotary part when the two parts are coupled with elastic deformation of the elastic member by the toothed ribs, the rotary part provided with the elastic member being provided with a circumferential groove therein in which the elastic member seats, and the rotary part provided with the elastic member being provided with a second groove to receive a second elastic member to contact a circumferential surface on the last-mentioned rotary part.

References Cited

UNITED STATES PATENTS

| 2,848,884 | 8/1958 | Maude | 64—30 |
| 2,956,656 | 10/1960 | Becksted | 192—30 XR |
| 2,992,715 | 7/1961 | Blachly | 192—108 |
| 3,263,452 | 8/1966 | Janssen et al. | 64—30 |

BENJAMIN W. WYCHE III, *Primary Examiner.*

U.S. Cl. X.R.

192—67; 64—30

UNITED STATES PATENT OFFICE
CERTIFICATE OF CORRECTION

Patent No. 3,424,287 January 28, 1969

Andre S. Dreiding

It is certified that error appears in the above identified patent and that said Letters Patent are hereby corrected as shown below:

In the heading to the printed specification, lines 3 and 4, "Andre S. Dreiding, Erlenbach, Germany, assignor to BP Chemicals (U.K.) Limited" should read -- Andre S. Dreiding, Laubholzstrasse 48, Erlenbach, Germany --.

Signed and sealed this 17th day of March 1970.

(SEAL)
Attest:

Edward M. Fletcher, Jr.
Attesting Officer

WILLIAM E. SCHUYLER, JR.
Commissioner of Patents